(12) United States Patent
Posti

(10) Patent No.: US 6,788,729 B1
(45) Date of Patent: Sep. 7, 2004

(54) FREQUENCY HOPPING METHOD AND BASE STATION

(75) Inventor: Harri Posti, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/582,000

(22) PCT Filed: Oct. 22, 1999

(86) PCT No.: PCT/FI99/00881

§ 371 (c)(1),
(2), (4) Date: Jun. 21, 2000

(87) PCT Pub. No.: WO00/25440

PCT Pub. Date: May 4, 2000

(30) Foreign Application Priority Data

Oct. 23, 1998 (FI) .................................................. 982300

(51) Int. Cl.[7] .......................... H04B 1/69; H04B 7/216; H04Q 7/00
(52) U.S. Cl. ........................ 375/133; 370/330; 370/342
(58) Field of Search ......................... 370/335, 18, 330; 375/132, 202

(56) References Cited

U.S. PATENT DOCUMENTS

| 4,942,589 | A | | 7/1990 | Smith et al. |
|---|---|---|---|---|
| 5,428,602 | A | * | 6/1995 | Kemppainen ................ 370/330 |
| 5,577,031 | A | | 11/1996 | Smith |
| 5,592,480 | A | | 1/1997 | Carney et al. |
| 5,638,399 | A | * | 6/1997 | Schuchman et al. ......... 370/324 |
| 5,774,790 | A | * | 6/1998 | Dupuy ........................ 370/337 |
| 5,974,081 | A | * | 10/1999 | Rosas et al. ................. 375/133 |
| 6,108,323 | A | * | 8/2000 | Gray ........................... 370/335 |
| 6,246,713 | B1 | * | 6/2001 | Mattisson .................... 375/132 |
| 6,519,467 | B1 | * | 2/2003 | Strakovsky ................. 455/462 |

* cited by examiner

Primary Examiner—Stephen Chin
Assistant Examiner—Cicely Ware
(74) Attorney, Agent, or Firm—Pillsbury Winthrop LLP

(57) ABSTRACT

The invention relates to a frequency hopping method and a base station including, at the receiver end, a number of baseband processing units and broadband receiver units, which form RF sub-bands and receive frequency hopping signals according to a frequency hopping sequence from the RF sub-bands they have formed. The base station includes, at the receiver end, a switching device and channelling unit, which receive baseband signals from an intermediate band and each of which is connected to a receiver unit forming a particular RF sub-band. The switching device selects, according to the frequency hopping sequence, the channelling unit whose baseband output provides the baseband signal which is connected to the baseband processing unit. The channelling unit places the baseband signals to its baseband output according to the frequency hopping sequence.

21 Claims, 3 Drawing Sheets

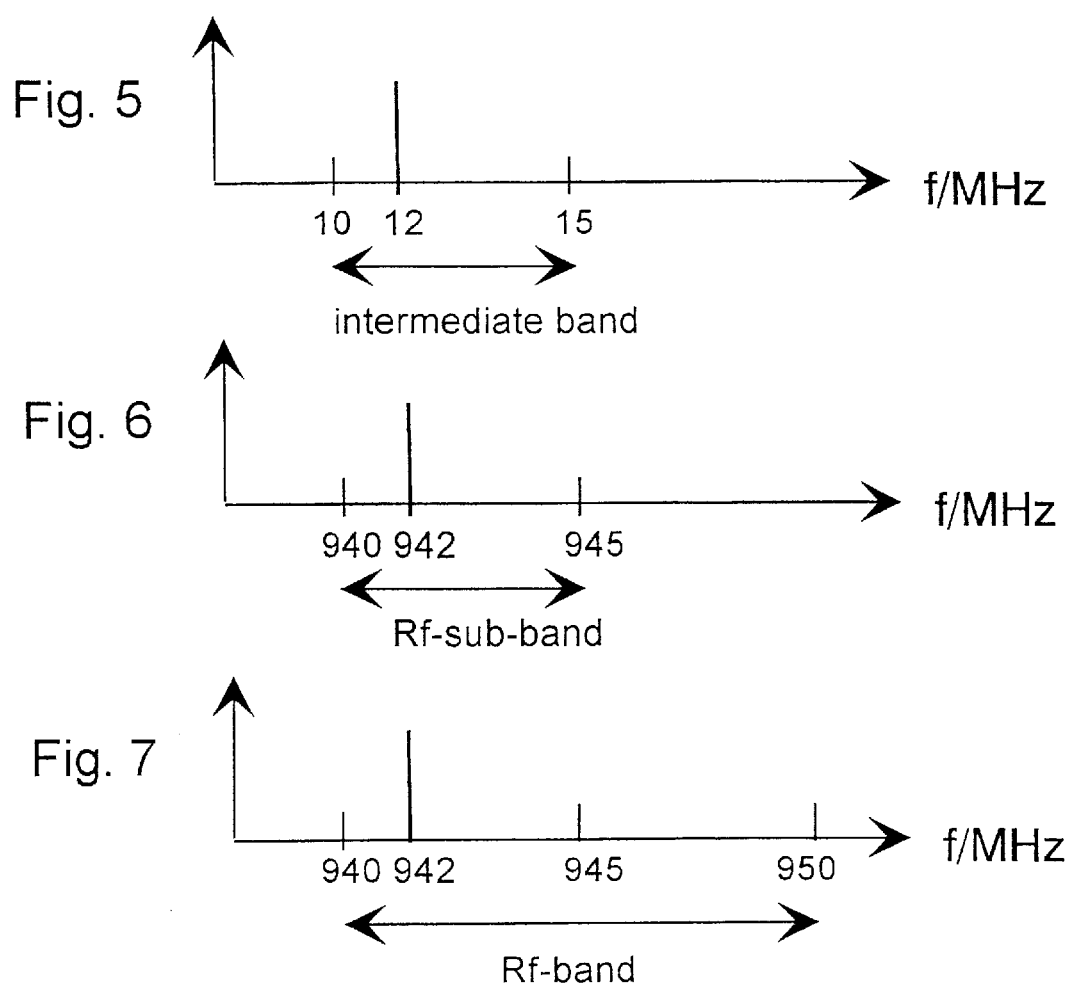

FREQUENCY HOPPING METHOD AND BASE STATION

This is the U.S. National Phase of International Application No. PCT/FI/99/00881, filed on Oct. 22, 1999, which designated the U.S. and was filed in the English language.

FIELD OF THE INVENTION

The invention relates to a frequency hopping method used in a base station comprising baseband processing means, the method comprising formation of RF sub-bands, to which signals are transmitted and from which signals are received in a broadband form, and the signals transmitted in the method are made to hop according to a frequency hopping sequence, and the received signals being subjected to dehopping.

BACKGROUND OF THE INVENTION

In cellular radio systems, the quality of a connection between a base station and subscriber terminals varies as a function of time and place. On average, the further the terminal equipments are situated from the base station, the more a signal is attenuated over the radio path. There are also other factors, such as obstructions and outside interference, affecting the quality of the signal at the reception.

GSM systems can employ a slow frequency hopping (SFH) method. In the frequency hopping a carrier wave is made to hop over the entire frequency band according to a predetermined sequence. The sequence used in the hopping can be, for example, a pseudo-random sequence. The primary advantage of slow frequency hopping is frequency diversity. When the data to be transmitted is provided with redundancy by means of encoding, the original data of the signal can be discovered even if the detected data signal contains errors. In signal transmission a data block is spread into several different bursts. By means of the slow frequency hopping it is possible to ensure that the information is transmitted on several frequencies so that the transmission capacity is improved. Due to frequency hopping the quality of the transmission can be improved particularly in situations where a terminal equipment moves very slowly or does not move at all, as it often happens when calls are made with mobile phones, for example.

On the other hand, frequency hopping is also useful when interference caused by a radio connection is scattered to several frequencies, in which case momentary interference on a particular frequency remains small. Similarly, strong interference received on a particular frequency causes errors only in a part of the data block. In such a case the original data can be detected without errors from the signal.

In several systems some of the channels used by the base station are frequency hopping channels, whereas some channels use fixed frequencies. This is necessary since some channels, such as signalling channels, must be transmitted on a particular frequency in order that they can be located by the terminal equipments. This is one of the reasons why different traffic channels of a base station can have rather different interference levels.

Prior art radio systems employ base stations comprising broadband transceiver units, which enable reduction of the base station size and the manufacturing costs. In some systems insufficiently developed technology has made it impossible to build a transceiver whose bandwidth would cover the entire frequency band allocated to the system.

The problems appearing in the implementation of broadband transceiver units mainly occur in elements that carry out D/A and AID conversions and in linear power amplifier parts. Therefore it is not possible to optimally utilize a frequency band in the radio systems.

The aforementioned effects of the problems can be reduced by providing a base station with several broadband transceiver units, each of which covers a particular RF sub-band, so that the entire frequency band will be covered. Broadband transceiver units of prior art base stations employ baseband parts which are fixedly connected. In the situation described above, a signal which has propagated via a particular baseband part is connected to a specific transceiver unit. However, the prior art method restricts the frequency hopping to a particular RF sub-band, wherefore the use of the frequency hopping is not as efficient as it could be.

BRIEF DESCRIPTION OF THE INVENTION

The purpose of the invention is to provide a method and equipment implementing the method, which solve the problems described above. This is achieved with a method of the type described in the introduction, which is characterized in that when the base station comprises channelling means, the RF sub-band and the channelling means to which a baseband signal formed by the baseband processing means is connected are selected according to the frequency hopping sequence in the transmission direction of the base station, the baseband signals connected to the channelling means are placed on an intermediate band according to the frequency hopping sequence in the transmission direction, the RF sub-band and the channelling means to which each baseband processing means is connected are selected according to the frequency hopping sequence in the direction of reception, the signals received by the channelling means, which are on the intermediate band, are placed on baseband outputs of the channelling means according to the frequency hopping sequence in the direction of reception.

The invention also relates to a base station comprising at the transmitter end a number of baseband processing means and broadband transmitter units, which form RF sub-bands and transmit frequency hopping signals according to a frequency hopping sequence to the RF sub-bands they have formed.

The base station according to the invention is characterized in that the base station comprises at the transmitter end a switching means and channelling means, which generate signals on an intermediate band and each of which is connected to a transmitter unit forming a particular RF sub-band, the switching means selects, according to the frequency hopping sequence, the channelling means to which a baseband signal formed by the baseband processing means is connected, the channelling means places the received baseband signals on an intermediate band according to the frequency hopping sequence.

The invention further relates to a base station comprising at the receiver end a number of baseband processing means and broadband receiver units, which form RF sub-bands and receive frequency hopping signals according to a frequency hopping sequence from the RF sub-bands they have formed.

The base station according to the invention is characterized in that the base station comprises at the receiver end a switching means and channelling means, which receive baseband signals from an intermediate band and each of which is connected to a receiver unit forming a particular RF sub-band, the switching means selects, according to the frequency hopping sequence, the channelling means whose baseband output provides the baseband signal which is connected to the baseband processing means, the channelling means places the baseband signals to its baseband outputs according to the frequency hopping sequence.

The preferred embodiments of the invention are disclosed in the dependent claims.

The invention is based on coordinated cooperation of switching means and channelling means provided in the base station, whereby any baseband signal can be connected to any transmitter unit. Therefore the signal forming the connection can be made to hop over the entire frequency range. A switching means provided at the receiver end of the base station connects signals from several different RF sub-bands to any baseband processing unit according to the received signal. An RF sub-band has been assigned in advance to the transmitter unit of the base station, which transmits a signal to this sub-band. The RF sub-bands of different transmitter units form an actual frequency band, and the signals transmitted to this band constitute a signal forming the connection. Also, each receiver unit receives a signal from a predetermined RF sub-band, whereafter the signal forming the connection can be formed from the signals of different sub-bands.

The method and the base station according to the invention provide several advantages. The method according to the invention enables frequency hopping on the entire frequency band allocated to the base station, even in a case where the technology restricts the bandwidth of the broadband transceiver units to a narrower level than the entire frequency band allocated to the base station. Optimum frequency and interference diversity can thus be achieved.

BRIEF DESCRIPTION OF THE FIGURES

The invention will be described below in greater detail in connection with the preferred embodiments and with reference to the accompanying drawings, in which FIG. 5 shows a signal on an intermediate band, FIG. 6 shows a signal on an RF sub-band, FIG. 7 shows the entire transmission band of the base station.

DETAILED DESCRIPTION OF THE INVENTION

Figure 1:
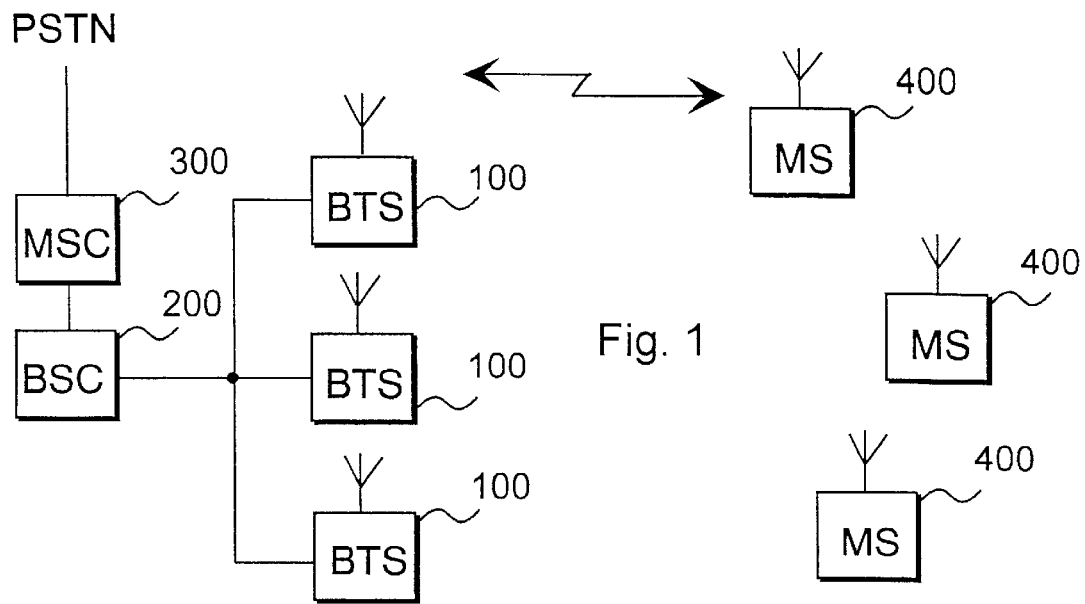
FIG. 1 shows a radio system utilizing the method according to the invention.

FIG. 1 shows a radio system comprising a base station 100, a base station controller 200, a mobile services switching centre 300 and a number of subscriber terminals 400. The radio system shown in the figure is for example a GSM system. The base stations and the subscriber terminals operate as transceivers in the arrangement shown in the figure. In the system of FIG. 1, the base station and the subscriber terminal can set up a connection by means of frequency hopping signals. The arrangement according to the invention preferably utilizes the slow frequency hopping method.

Figure 2:
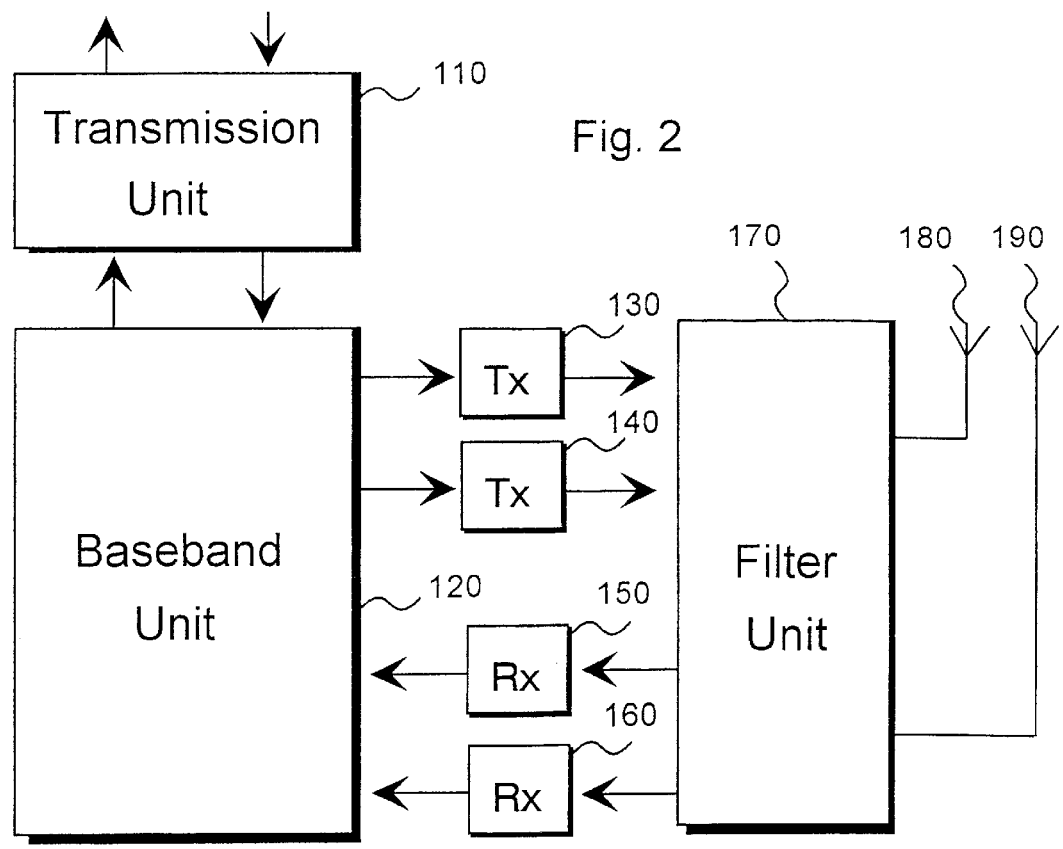
FIG. 2 shows a base station according to the invention.

FIG. 2 shows the structure of the base station 100 in more detail. The base station 100 comprises a transmission unit 110, a baseband unit 120, transmitter units 130, 140, receiver units 150, 160 and a filter unit 170 for signals. The base station 100 also comprises a transmitting antenna 180 and a receiving antenna 190. In practice, the transmitting antenna 180 and the receiving antenna 190 can be integrated into the same antenna.

The base station according to the invention can comprise a plurality of baseband units and transceiver units. The transmitter units 130, 140 and the receiver units 150, 160 shown in the figure operate on a broadband basis, which means that they are able to process several narrowband signals. However, the frequency band of an individual transmitter or receiver unit is narrower than the entire frequency band of the base station.

The base station 100 shown in FIG. 2 operates in the transmission direction basically in the following manner. The transmission unit 110 of the base station receives a signal for example from the base station controller 200. The signal is transmitted from the base station controller 200 to the base station 100 for example via a PSTN. The signal supplied to the transmission unit I 10 is forwarded from the transmission unit to the baseband unit 120, which subjects the signal to channel coding, interleaving and encryption, among other things.

The signal which is subjected to frequency hopping is supplied to the transmitter unit. The transmitter unit amplifies and up-converts the received signal, which is thereafter modulated for example with a Direct Digital Synthesis (DDS) method in the channelling means. The modulated, amplified and up-converted signal is supplied to the filter unit 170, which filters unwanted frequencies from the signal so that they cannot interfere with other signals. After the filtration the signal is supplied to the transmitting antenna 180, which transmits the signal that has been subjected to frequency hopping for example to a subscriber terminal 400. The transmitter units 130, 140 can form a transmitting frequency by converting an intermediate frequency directly into a suitable transmitting frequency. Each transmitter unit is able to process a plurality of intermediate frequencies.

The base station 100 operates in the following manner in the direction of reception. The base station receives a frequency hopping signal with its receiving antenna. The received signal is supplied to the filter unit 170, which filters out signals that have accumulated in the signal over the radio path and that might interfere with the processing of the signal later on. The filter unit 170 can also subject the signal to low-noise amplification. The filtered signal is supplied to the receiver unit, which amplifies and down-converts the received signal. The signal is supplied from the receiver unit to the baseband unit 120, which performs for example channel decoding, deinterleaving and decryption on the signal. The signal is thereafter supplied to the transmission unit 110, which places the signal for example on the transmission path, via which the signal is transmitted to the desired destination. The transfer rate over the transmission path can be for example 2 Mbit/s.

Figure 3:
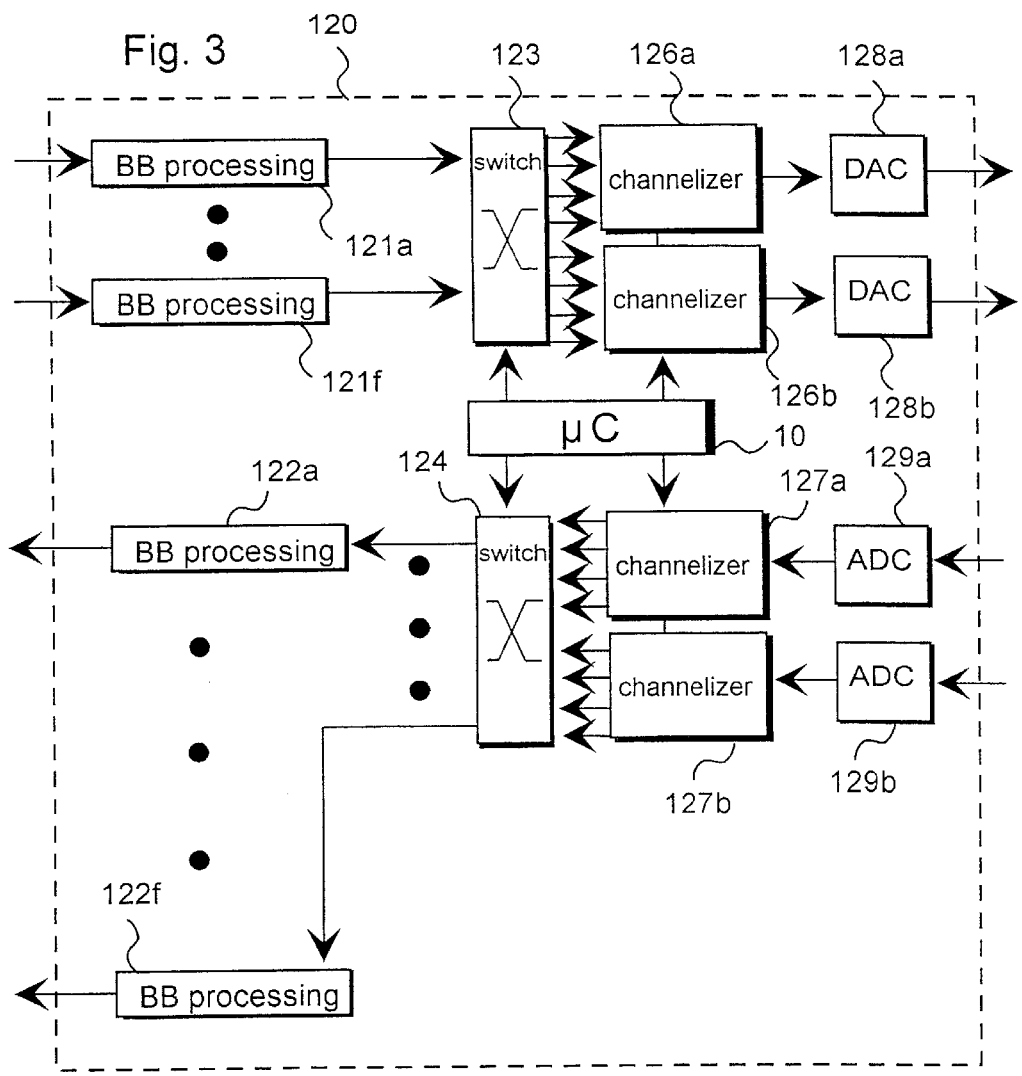
FIG. 3 shows a baseband unit of the base station.

FIG. 3 shows in greater detail a base station comprising baseband processing means 121a–121f, 122a–122f, situated in practice in the baseband unit 120. The base station also comprises a switching means 123, 124, converter means 128a, 128b, 129a, 129b and a controller 10. The base station further comprises channelling means 126a, 126b, which modulate the signal and transfer it to the intermediate frequency. The base station further comprises channelling means 127a, 127b, which transfer the signal from the intermediate frequency to the baseband. The implementation of the channelling means can be based on for example the FFT/IFFT and Numerically Controlled Oscillator (NCO) arrangements. The frequency hopping applied at the transmitter end in the base station according to the invention is carried out by means of cooperation of the switching means and the channelling means situated at the transmitter end.

In the arrangement shown in the figure, the baseband processing means 121, the switching means 123, the channelling means 126a, 126b and the converter means 128a, 128b are situated at the transmitter end in the base station. In this case the transmitter end refers to the direction of transmission from the base station to the radio path. Each channelling means 126a, 126b is connected to a separate converter means, which converts a digital signal transmitted by the channelling means into an analog signal.

The baseband processing means 122a–122f, the switching means 124, the channelling means 127a, 127b, and the converter means 129a, 129b, in turn, are situated at the receiver end of the base station. Each converter means 129 receives a broadband analog signal from its own RF block, and the converter means convert the signals arriving from the RF blocks into digital signals. The output of the channelling means provides baseband signals, each of which is selected from a different frequency of the received signal.

The controller 10 controls the operation of the switching means and the channelling means. The controller 10 can be implemented by means of a microprocessor or an ASIC, for example. In the base station according to the invention, frequency hopping is implemented by means of coordinated cooperation of the channelling means and the switching means. The operations of the channelling means and the switching means are synchronized during an inter-burst guard period. The settings required in the aforementioned cooperation are determined according to the frequencies of the frequency hopping sequence. They are also dependent on the properties of the transmitter unit and the width and number of the RF sub-bands.

The baseband processing means 121a–121f of the baseband unit 120 receive signals transmitted by the transmission unit 110 of the base station. The baseband processing means 121a–121f generate signals, which are then transferred by the channelling unit to a correct location within the RF sub-band. The baseband unit of FIG. 3 comprises at the transmitter end several baseband processing means, which process signals that are thereafter supplied to the switching means 123. The switching means 123 is implemented such that under the control of the controller 10 it can connect signals independently of one another from any baseband processing means 121a–121f to either of the channelling means 126a, 126b. In the arrangement shown in the figure, each channelling means 126a, 126b is able to channel, under the control of the controller 10, an equal number of signals as there are baseband processing means at the transmitter end of the base station.

The channelling means 127 select one frequency from the RF sub-band for each of their inputs. Further, each broadband receiver unit supplies one RF sub-band to its channelling means. The converter means 129 transfer the signals they have converted into a digital form to the channelling means, each of which processes, under the control of the control means 10, the signals converted by one converter means 129. In the baseband unit shown in the figure, the output signals of the channelling means 127a, 127b are supplied to the switching means 124. The switching means 124 situated in the base station is able to connect the signals it has received from the channelling means 127a, 127b to any baseband processing means 122a–122f.

At the receiver end of the base station, each multiplexing means 127 can channel an equal number of signals as there are baseband processing means at the receiver end. The switching means 123, 124 can be implemented for example by a digital switch or a time-switched bus structure. It is possible to use for example duplexing or diversity methods in the base station shown in FIG. 3.

Figure 4:
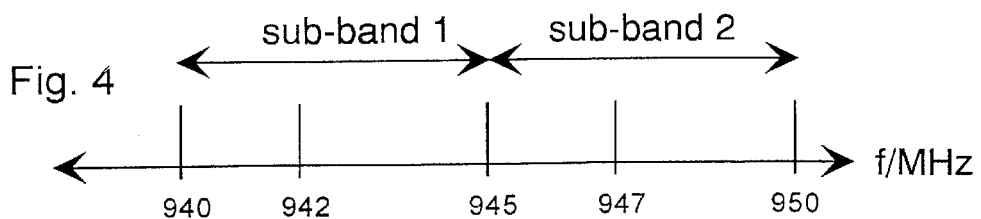
FIG. 4 shows a frequency band of the base station.

In practice, a frequency band has been allocated to the base station 100 in advance, and the base station should operate on this band. FIG. 4 shows a frequency band of the base station, used for transmitting a signal to a subscriber terminal. Assume that the frequency band allocated to the base station is between 940 MHz and 950 MHz. If the base station comprises only transmitter units which transmit a signal on a band of 5 MHz, two transmitter units are required in order that the entire frequency band of the base station can be covered. A frequency range of 940 MHz to 945 MHz covers the lower frequency band from the entire band of the base station. A frequency range 945 MHz to 950 MHz, in turn, covers the upper RF sub-band from the entire base station frequency band. Assume that transmitter unit 130 of the base station covers the lower RF sub-band. Assume further that transmitter unit 140 of the base station covers the upper frequency band.

If one of the signals used in the frequency hopping sequence is for example a signal of 942 MHz, the controller 10 detects that the frequency of the FH sequence signal belongs to the lower frequency band. After the frequency has been identified, the switching means 123 connects the signal to the channelling means 126a. From the channelling means 126a the signal is supplied via the converter means 128a to the transmitter unit 130, which transmits the signal to the lower frequency band. The controller 10 also guides the channelling means 126a to place the frequency hopping signal on a desired location on the frequency band. In the situation described above, this location on the lower frequency band is 2 MHz above the lower edge of the transmitter's frequency band.

If another signal of the frequency hopping sequence is for example a signal of 947 MHz, the controller 10 detects that the frequency of the signal used in the frequency hopping belongs to the upper frequency band. After the signal frequency band has been identified, the switching means 123 connects the signal that is to be subjected to frequency hopping to the channelling means 126b. From the channelling means 126b the signal is supplied via the converter means 128b to the transmitter unit 140, which transmits the signal on a desired frequency to the upper frequency band. In the situation described above, the desired location is situated on the upper frequency band of the transmitter in question, more specifically 2 MHz from the lower edge of the upper frequency band. The RF sub-bands of the transmitter units 130, 140 can also overlap partly. Further, the width of each RF sub-band is independent of the width of the other RF sub-band.

FIG. 5 shows a signal of an intermediate band. FIG. 5 shows that an intermediate band is formed between 10 MHz and 15 MHz, and it comprises a signal with a frequency of 12 MHz. The intermediate band is formed by the channelling unit. The 12 MHz signal on the intermediate band propagates from the channelling unit to the converter means 128a, whereafter the signal is supplied to the transmitter unit 140. The transmitter unit 140 operates on a frequency band of 940 to 945 MHz, which forms an RF sub-band.

FIG. 6 shows a signal on an RF sub-band. FIG. 6 shows that the transmitter unit has transferred the signal from the intermediate band to the RF sub-band. The switching means 123 selects the RF sub-band. The figure shows that the frequency of the signal on the RF sub-band is 942 MHz. The location of the signal within the RF sub-band is selected by the channelling unit. Each channelling unit at the transmitter end places the output signals that are on a low intermediate frequency into a separate transmitter unit, which transmits the signals to its own RF sub-band.

FIG. 7 shows the entire transmission band of the base station. The figure shows that the RF sub-bands of the base station have been combined into the transmission band of the base station. The transmission band operates on a frequency band of between 940 and 950 MHz, which also comprises the 942 MHz signal formed by the transmitter unit 140. The selection of the RF sub-band at the receiver end of the base station and the selection of the signal from the RF sub-band are basically carried out similarly as at the transmitter end of the base station.

The frequency hopping method according to the invention used in the base station comprises the formation of RF sub-bands, to which signals are transmitted in a broadband form. The signals transmitted by the base station are made to hop according to the frequency hopping sequence before they are transmitted to the radio path. The frequency hopping method also comprises reception of signals in a broadband form by means of the receiver units situated in the base station. The base station subjects the received signals to dehopping.

The channelling means 126 which are situated at the transmitter end of the base station and which generate signals to the intermediate band are connected to a transmitter unit forming a particular RF sub-band. For example, ff channelling means 126a is connected to transmitter unit 130, channelling means 126b is connected to transmitter unit 140. The switching means 123 situated at the transmitter end of the base station selects, according to the frequency hopping sequence, the channelling means 126 of the transmitter end to which a baseband signal formed by the baseband processing means 121 is connected. Each baseband processing means 121 connects baseband signals independently of one another to any channelling means 126 in the transmission direction. The channelling means 126 place the received baseband signals to the intermediate band according to the frequency hopping sequence. Each channelling means 126 selects the location of the signal to be placed on the intermediate band within the sub-band.

The channelling means at the receiver end of the base station receive signals placed on the intermediate band. Each channelling means 127 is connected to a separate receiver unit 150, 160, and each receiver unit forms a particular RF sub-band. If channelling means 127a is connected to receiver unit 150, channelling means 127b is connected to receiver unit 160. The switching means 124 situated at the receiver end of the base station selects, according to the frequency hopping sequence, the channelling means 127 whose baseband output provides a baseband signal which is forwarded to one of the baseband processing means 122. The channelling means 127 places the received baseband signals to its baseband outputs according to the frequency hopping sequence, and the signals are further connected from the outputs to one of the baseband processing means 122. The switching means 124 connects the output signals of the channelling means 127 independently of one another to any baseband processing means 122 at the receiver end.

The base station controller 10 controls the connection of signals by the switching means 123 provided at the transmitter end and the operation of the channelling means 126 situated at the transmitter end by means of mutually synchronized settings, which are activated during an inter-burst guard period. The controller 10 similarly controls the connection of signals by the switching means 124 provided at the receiver end and the operation of the channelling means 127 situated at the receiver end.

Even though the invention is described above with reference to the example according to the accompanying drawings, it is clear that the invention is not restricted thereto but it can be modified in several ways within the scope of the inventive idea disclosed in the appended claims.

What is claimed is:

1. A frequency hopping method used in a base station comprising baseband processing means, the method comprising:

transmitting and receiving signals in a broadband form using RF sub-bands, utilizing frequency hopping when transmitting signals and dehopping when receiving signals according to a frequency hopping sequence, selecting the RF sub-band and the channelling means to which a baseband signal formed by the baseband processing means is connected according to the frequency hopping sequence in the transmission direction of the base station, placing the baseband signals connected to the channelling means on an intermediate band according to the frequency hopping sequence in the transmission direction of the base station, selecting the RF sub-band and the channelling means to which each baseband processing means is connected according to the frequency hopping sequence in the direction of reception, and placing the signals received by the channelling means, which are on the intermediate band, on baseband outputs of the channelling means according to the frequency hopping sequence in the direction of reception.

2. A method according to claim 1, wherein baseband signals are connected from the baseband processing means independently of one another to any channelling means in the transmission direction.

3. A method according to claim 1, wherein output signals of any channelling means are connected to the baseband processing means in the direction of reception.

4. A method according to claim 1, wherein the connection of a baseband signal formed by the baseband processing means in the transmission direction and the operation of the channelling means in the transmission direction are controlled by means of mutually synchronized timings, which are activated during a guard period between bursts to be transmitted.

5. A method according to claim 1, wherein the connection of a baseband signal formed for the baseband processing means in the direction of reception and the operation of the channelling means in the direction of reception are controlled by means of mutually synchronized timings, which are activated during a guard period between bursts to be received.

6. A method according to claim 1, wherein the method utilizes slow frequency hopping.

7. A method according to claim 1, wherein the channelling means employ a direct digital synthesis, numerically controlled oscillator or fast fourier transform method, or methods corresponding to the aforementioned methods.

8. A method according to claim 1, wherein the RF sub-bands can overlap either partly or entirely.

9. A base station comprising:

at the transmitter end, a number of baseband processing means and broadband transmitter units, which transmit and receive signals in a broadband form using RF sub-bands and utilize frequency hopping when transmitting signals and dehopping when receiving signals according to a frequency hopping sequence, at the transmitter end, a switching means and channelling means, which generate signals on an intermediate band, each of which being connected to a transmitter unit forming a particular RF sub-band, wherein the switching means selects, according to the frequency hopping sequence, the channelling means to which a baseband signal formed by the baseband processing means is connected, and the channelling means places the received baseband signals on an intermediate band according to the frequency hopping sequence.

10. A base station comprising:

at the receiver end, a number of baseband processing means and broadband receiver units, which form RF sub-bands and receive frequency hopping signals according to a frequency hopping sequence from the RF sub-bands they have formed, at the receiver end, a switching means and channelling means, which receive baseband signals from an intermediate band and each of which is connected to a receiver unit forming a particular RF sub-band, wherein the switching means selects, according to the frequency hopping sequence, the channelling means whose baseband output provides the baseband signal which is connected to the baseband processing means, and the channelling means places the baseband signals to its baseband outputs according to the frequency hopping sequence.

11. A base station according to claim 9, wherein the channelling means at the transmitter end places the signals provided at the baseband outputs on an intermediate band, and the location of a signal within a sub-band is selected by the channelling means.

12. A base station according to claim 10, wherein the switching means at the receiver end connects the output signals of the channelling means independently of one another to any baseband processing means at the receiver end.

13. A base station according to claim 10, wherein each channelling means at the receiver end is connected to a receiver unit forming a particular RF sub-band.

14. A base station according to claim 9, further comprising a controller, which controls the connection of signals by the switching means provided at the transmitter end and the operation of the channelling means situated at the transmitter end by means of mutually synchronized timings, which are activated during an inter-burst guard period.

15. A base station according to claim 10, further comprising a controller, which controls the connection of signals by the switching means provided at the receiver end and the operation of the channelling means situated at the receiver end by means of mutually synchronized timings, which are activated during an inter-burst guard period.

16. A base station according to claim 9, wherein the base station utilizes slow frequency hopping.

17. A base station according to claim 9, wherein the channelling means generate an intermediate signal with a direct digital synthesis, numerically controlled oscillator or inverse fast fourier transform method, or with methods corresponding to the aforementioned methods.

18. A base station according to claim 9, wherein the RF sub-bands of the base station can overlap either partly or entirely.

19. A base station according to claim 10, wherein the base station utilizes slow frequency hopping.

20. A base station according to claim 10, wherein the channelling means generate an intermediate signal with a direct digital synthesis, numerically controlled oscillator or inverse fast fourier transform method, or with methods corresponding to the aforementioned methods.

21. A base station according to claim 10, wherein the RF sub-bands of the base station can overlap either partly or entirely.

* * * * *